United States Patent [19]

Kawasaki

[11] Patent Number: 5,159,467

[45] Date of Patent: Oct. 27, 1992

[54] IMAGE SIGNAL RESTORING DEVICE

[75] Inventor: Somei Kawasaki, Tokyo, Japan

[73] Assignee: Canon Kabushiki Kaisha, Tokyo, Japan

[21] Appl. No.: 830,741

[22] Filed: Feb. 3, 1992

Related U.S. Application Data

[63] Continuation of Ser. No. 489,218, Mar. 6, 1990.

[30] Foreign Application Priority Data

Mar. 9, 1989 [JP] Japan .................................. 1-055222

[51] Int. Cl.$^5$ .............................................. H04N 1/32
[52] U.S. Cl. ..................................... 358/447; 358/448; 358/452
[58] Field of Search ................. 358/80, 166, 400, 401, 358/405, 404, 406, 432, 433, 443, 444, 448, 462, 468, 470, 447, 452, 312, 320, 324, 325, 326, 342; 360/33.1, 36.1, 221

[56] References Cited

U.S. PATENT DOCUMENTS

| | | | |
|---|---|---|---|
| 4,222,077 | 9/1980 | Yamada | 358/470 |
| 4,769,719 | 9/1988 | Endo | 358/442 |
| 4,896,222 | 1/1990 | Fukai | 358/443 |
| 4,967,263 | 10/1990 | Dieterich | 358/11 |

Primary Examiner—Edward L. Coles, Sr.
Assistant Examiner—Jerome Grant, II
Attorney, Agent, or Firm—Robin, Blecker, Daley & Driscoll

[57] ABSTRACT

An image signal restoring device is arranged to input a digital image signal, to output a digital image signal which has been delayed for a first period of time when the input digital image signal is delayed for the first period of time, and to output a digital image signal obtained by adding together the input digital image signal and a digital image signal which has been delayed for a second period of time when the input digital image is delayed for the second period of time. The arrangement enables the device to stably restore the image signal without any adjustment, etc.

10 Claims, 4 Drawing Sheets

IMAGE SIGNAL RESTORING DEVICE

This is a continuation of prior application Ser. No. 489,218, filed Mar. 3, 1990, now abandoned.

BACKGROUND OF THE INVENTION

1. Field of the Invention

This invention relates to a device for restoring image signals.

2. Description of the Related Art

The image signal restoring devices which have heretofore been known include an electronic still camera system. The electronic still camera system is arranged to record a still image signal on, for example, a magnetic disc and to reproduce the recorded still image signal. FIG. 1 of the accompanying drawings shows the frequency spectrum of a recording still image signal obtained by the electronic still camera system. Referring to FIG. 1, a luminance signal component Y is frequency-modulated after an emphasis process. A chrominance signal component C is frequency-modulated to a low frequency band after two color-difference signals R-Y and B-Y are converted into a line sequential state and is then subjected to an emphasis process. The recording image signal is obtained by frequency-multiplexing the luminance signal component Y and the chrominance signal component C. One field amount of the recording image signal is recorded in each of a plurality of concentric tracks formed on a magnetic disc.

FIG. 2 shows the still image signal transmitting and receiving device of the electronic still camera system arranged to reproduce a still image signal which is recorded on the magnetic disc in the above-stated manner and to transmit the reproduced signal, for example, over a telephone line or the like. In the still image signal transmitting and receiving device of FIG. 2, the magnetic disc 33 having the record of the still image signal is rotated by a motor 34 in accordance with a field period. A magnetic head 32 reproduces the recorded signal from the magnetic disc 33 which is thus rotated. The reproduced signal is sufficiently amplified by a pre-amplifier 31 and is, after that, supplied to a high-pass filter (hereinafter referred to as HPF) 23 to have a luminance signal component separated therefrom. The luminance signal component is then restored to a luminance signal by a frequency demodulator 22 and a de-emphasis circuit 21. Further, the output of the pre-amplifier 31 is also supplied to a low-pass filter (hereinafter referred to as LPF) 30 to have a chrominance signal component separated by the LPF 30. The chrominance signal component is then restored to a color-difference line-sequential signal by a frequency demodulator 29 and a deemphasis circuit 28.

In order to transmit over a telephone line the still image signal which is restored and reproduced in the above-stated manner, the reproduced still image signal must be time-base-expanded and band-compressed by temporarily taking it into a digital memory and by reading it out at a speed which is slower than a speed at which it is taken into the digital memory. To meet this, in transmitting the still image signal, the connecting positions of switches SW10 and SW9 are set on their sides "b" respectively in accordance with an instruction given from a system controller which is not shown. This allows the reproduced luminance signal to be supplied as it is to a color-difference-to-RGB conversion matrix circuit 15. Meanwhile, the reproduced color-difference line-sequential signal is supplied to a switch SW13 which is connected to its one side "b". The switch SW13 supplies the color-difference line-sequential signal to a line-simultaneous conversion circuit which consists of a delay (DL) circuit 26 for delaying the input for one horizontal scanning period (hereinafter referred to as H) and switches SW11 and SW12. The line-sequential signal is then line-simultaneous-converted into two different color-difference signals. The two color-difference signals thus obtained are supplied also to the color-difference-to-RGB conversion matrix circuit 15.

The connecting position of each of the switches SW11 and SW12 is arranged to be on one side "b" thereof when a color-difference signal R-Y is received and to be on the other side "a" when a color-difference signal B-Y is received. These signals R-Y and B-Y are simultaneously output from these switches SW11 and SW12. The signals R-Y and B-Y are supplied to an addition type 1H comb-filter which consists of 1H delay circuits (DLs) 24 and 25 and adders 24a and 25a. The filter performs an averaging process on these signals R-Y and B-Y before they are supplied to the color-difference-to-RGB conversion matrix circuit 15.

The color-difference-to-RGB conversion matrix circuit 15 forms R (red), G (green) and B (blue) color signals by using the luminance signal and the two color-difference signals supplied to the circuit 15. The R, G and B signals are supplied to analog-to-digital (hereinafter referred to as A/D) converters 9, 10 and 11. Each of the A/D converters 9, 10 and 11 then samples and converts the input signal into a digital signal of eight bits per sample. The digital signals thus obtained are respectively taken into an R memory 6, a G memory 7 and a B memory 8 in blocks of filed signals. Meanwhile, a synchronizing (hereinafter referred to as sync) signal is separated by a sync signal separation circuit 18 from the luminance signal which is output from the switch SW9. The sync signal thus separated is supplied to a memory control circuit 16 via a switch SW5 which is connected to one side "b" thereof. Then, in synchronism with the sync signal supplied, the memory control circuit 16 designates the writing addresses of the digital memories 6, 7 and 8. The action of writing these digital signals into these memories is thus controlled.

After one field amount of each of these digital signals (or data) is written into each of the digital memories 6, 7 and 8, the data is read out from the memory in synchronism with a sufficiently low-speed clock signal for the purpose of transmitting it via the telephone line. The data thus read out is supplied via a switch SW1 to a digital-to-analog (hereinafter referred to as D/A) converter 4. The D/A converter 4 converts the input data into an analog signal. The analog signal is then supplied to a modulator 2 to be converted into a signal form suited for the telephone line. The output of the modulator 2 is sent to the telephone line 1 via a switch SW14 which is connected to one side "a" thereof. Further, a frequency modulator or an amplitude modulator is employed, for example, as the modulator 2. The switch SW1 is provided for the purpose of supplying the R, G and B signals stored in the digital memories 6, 7 and 8 to the D/A converter 4 in the form of a frame-sequential digital signal. The connecting position of this switch SW1 is changed from one side thereof over to another every time one field amount of data is caused to be output from the digital memories 6, 7 and 8 by the system controller which is not shown.

In receiving a still image signal which is supplied via the telephone line 1, on the other hand, the switch SW14 is connected to one side "b" thereof to receive the input still image signal. The input signal is demodulated by a demodulator 3. The demodulated image signal is A/D-converted by an A/D converter 5. The output of the A/D converter 5 is then supplied to the digital memories 6, 7 and 8.

Since the input signal from the telephone line 1 is a frame-sequential signal consisting of R, G and B signals, the connecting position of the above-stated switch SW15 is changed from one contact over to another according to these signals by the system controller which is not shown. Meanwhile, the connecting positions of the switches SW2, SW3 and SW4 are on their sides "b" at that time. Further, if the input signal transmitted is a field still image signal, a computing operation is performed, at the same time, at each of the digital memories 6, 7 and 8 to form an interpolating field still image signal for a field image signal not transmitted.

Further, in cases where a still image signal which is thus restored from the transmitted input signal is to be displayed on an external monitor device or to be printed out by a printer, the restored signal must be output to the outside in the form of R, G and B signals. In outputting the transmitted input signal to the outside in this manner, the data stored in the digital memories 6, 7 and 8 is first read out in the following manner: A sync signal is generated by a sync signal generator (SSG) 17. The sync signal is supplied to a memory control circuit 16 via a switch SW5 which is connected to one side "a" thereof. The memory control circuit 16 then causes the data to be read out from the digital memories 6, 7 and 8 at a high speed in such a way as to make the data into the original still image signal. The data thus read out is supplied to D/A converters 12, 13 and 14, which convert the input data into analog R, G and B signals respectively. These analog R, G and B signals are then output via 75-ohm driving circuits 35, 36 and 37 to the applicable external device. Further, the sync signal generated by the sync signal generator 17 is also supplied to the external device via the switch SW5 and a 75-ohm driving circuit 38.

As described above, even in a case where the transmitted input signal is a field still image signal, the interpolating process computing operation performed at the digital memories enables the system to form and produce a frame still image signal without any skew.

In transmitting the still image signal reproduced from the magnetic disc over the telephone line in accordance with the procedures described in the foregoing, it is occasionally required to confirm the contents of the signal by means of a monitor device or the like before the signal is transmitted. On that occasion, if the reproduced still image signal is a field still image signal, an interpolating field still image signal must be formed with a known skew compensating process applied thereto. However, the skew compensating process would require an excessively long period of time if it is carried out by performing a computing process at the digital memories. To avoid this, the conventional system has been arranged to perform the skew compensating process by means of an analog circuit which consists of 0.5H analog delay circuits 19 and 27 and a 1H analog delay circuit 20 which are shown in FIG. 2.

Further details of the above-stated reproducing processes are as follows: The reproduced luminance signal output from the deemphasis circuit 21 is supplied as it is to the adder 20a via the side "b" of the switch SW10 while it is supplied also to the 1H analog delay (DL) circuit 20. At the adder 20a, an average value of a signal which is delayed for a 1-H period by the 1H analog delay circuit 20 and a signal which is not delayed is computed. By this, an interpolating luminance signal is obtained and is supplied to the side "a" of the switch SW10. An interpolating action is performed on the luminance signal by changing the connecting position of the switch SW10 between its sides "a" and "b" for every field period. The interpolated luminance signal is thus output from the switch SW10. The position of the switch SW10 stays on the side "a" for a vertical equalizing pulse interval during the above-stated operation.

The luminance signal output from the switch SW10 undergoes a skew compensating process performed jointly by an 0.5H analog delay circuit 19 and a switch SW9. More specifically, the connecting position of the switch SW9 is on one side "a" thereof while the switch SW10 is on its side "b". This allows the luminance signal from the switch SW10 to be output via the 0.5H analog delay circuit 19. The position of the switch SW9 is on the other side "b" while that of the switch SW10 is on its side "a" to allow the luminance signal from the switch SW10 to be output as it is. Further, in the operation described, the luminance signal which is allowed to pass through both the 0.5H analog delay circuit 19 and the 1H analog delay circuit 20 is never output. Further, an interlaced frame luminance signal is output from the switch SW9 by always keeping the connecting position of the switch SW9 on the side "b" thereof during the period of the vertical equalizing pulse interval.

Further, to perform a skew compensating process also for the color-difference signals, a 0.5H analog delay circuit 27 and a switch SW13 are likewise operated to accomplish the skew compensating process, in the same manner as in the case of the luminance signal. After that, the color-difference signals are subjected to a line-simultaneous conversion process before it is output.

An interlaced frame still image signal is formed in the above-stated manner, including two color-difference signals and a luminance signal. The frame still image signal is supplied to the color-difference-to-RGB conversion matrix circuit 15 to be converted into R, G and B signals. The R, G and B signals are output through the switches SW6, SW7 and SW8 and the 75-ohm driving circuits 35, 36 and 37. At that time, the switches SW6, SW7 and SW8 are on their sides "a". Meanwhile, the switch SW5 is on its side "b" to allow the sync signal which is separated by the sync signal separation circuit 18 to be also output through the 75-ohm driving circuit 38.

However, the conventional device which is arranged as described in the foregoing has presented the following problems: For carrying out the interpolating and skew compensating actions on the luminance signal and the line-simultaneous converting and skew compensating actions on the color-difference signals in reproducing the still image signal recorded on the magnetic disc, the conventional device uses an analog delay element such as a CCD (charge-coupled device) in general. However, the use of the CCD necessitates highly sensitive adjustment for correcting the level of the delayed signal. In addition to that, a temperature drift is apt to take place to bring about a flicker due to level variations in the output still image signal.

SUMMARY OF THE INVENTION

It is a general object of this invention to provide an image signal restoring device which is capable of solving the above-stated problems of the prior art.

It is a more specific object of the invention to provide an image signal restoring device which is capable of stably restoring image signals without necessitating any adjustment, etc.

Under this object, an image signal restoring device which is arranged according to this invention as an embodiment thereof comprises: memory means arranged to input a digital image signal and to delay the input digital image signal either for a first period of time or for a second period of time which differs from the first period of time; addition means arranged to add together the digital image signal which has been delayed by the memory means and a digital image signal which is input to the memory means and to output a signal resulting from the addition; and selective output means arranged to input the signal output from the memory means and the signal output from the addition means and to select and output either the signal output from the memory means when the input digital image signal is delayed for the first period of time by the memory means or the signal output from the addition means when the input digital image signal is delayed for the second period of time by the memory means.

It is another object of the invention to provide an image signal restoring device which excels in operability and is capable of performing a processing action on an arbitrarily selected image signal in parallel with a reproducing action performed on an image signal recorded on a recording medium.

Under that object, an image signal restoring device arranged according to this invention as an embodiment thereof comprises: reproducing means arranged to reproduce from a recording medium an analog image signal recorded on the recording medium, to convert the reproduced analog image signal into a first digital image signal and to output the first digital image signal; memory means for selectively storing either the first digital image signal output from the reproducing means or a second digital image signal which differs from the first digital image signal; and digital image signal forming means for forming a third digital image signal by using the first digital image signal output from the reproducing means.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
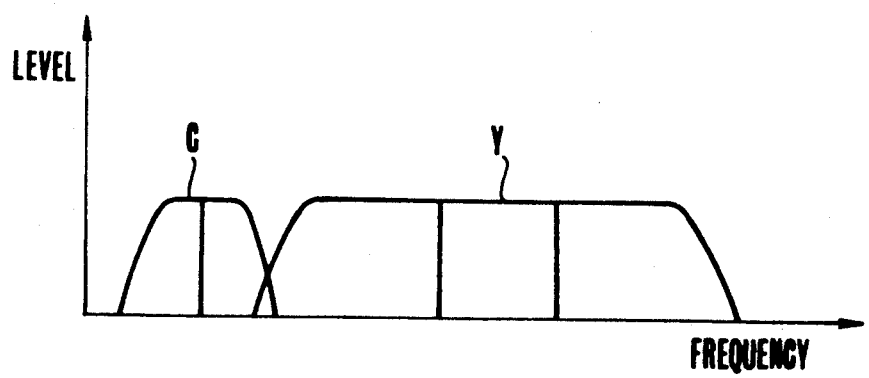
FIG. 1 shows the frequency spectrum of a recording signal to be recorded on a magnetic disc by an electronic still camera system.
Figure 2:
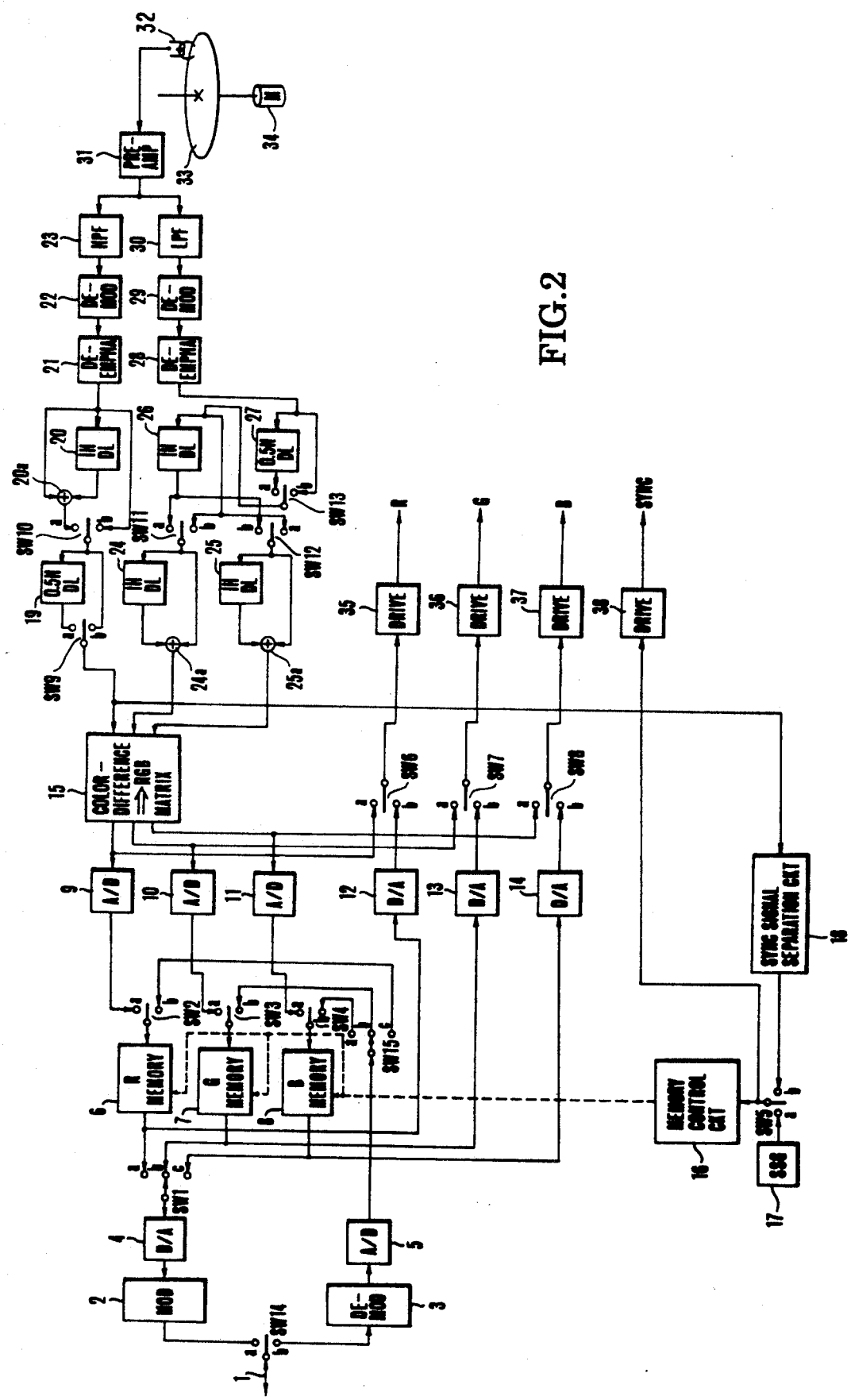
FIG. 2 is a block diagram showing by way of example the arrangement of the conventional still image transmitting and receiving device.
Figure 3:
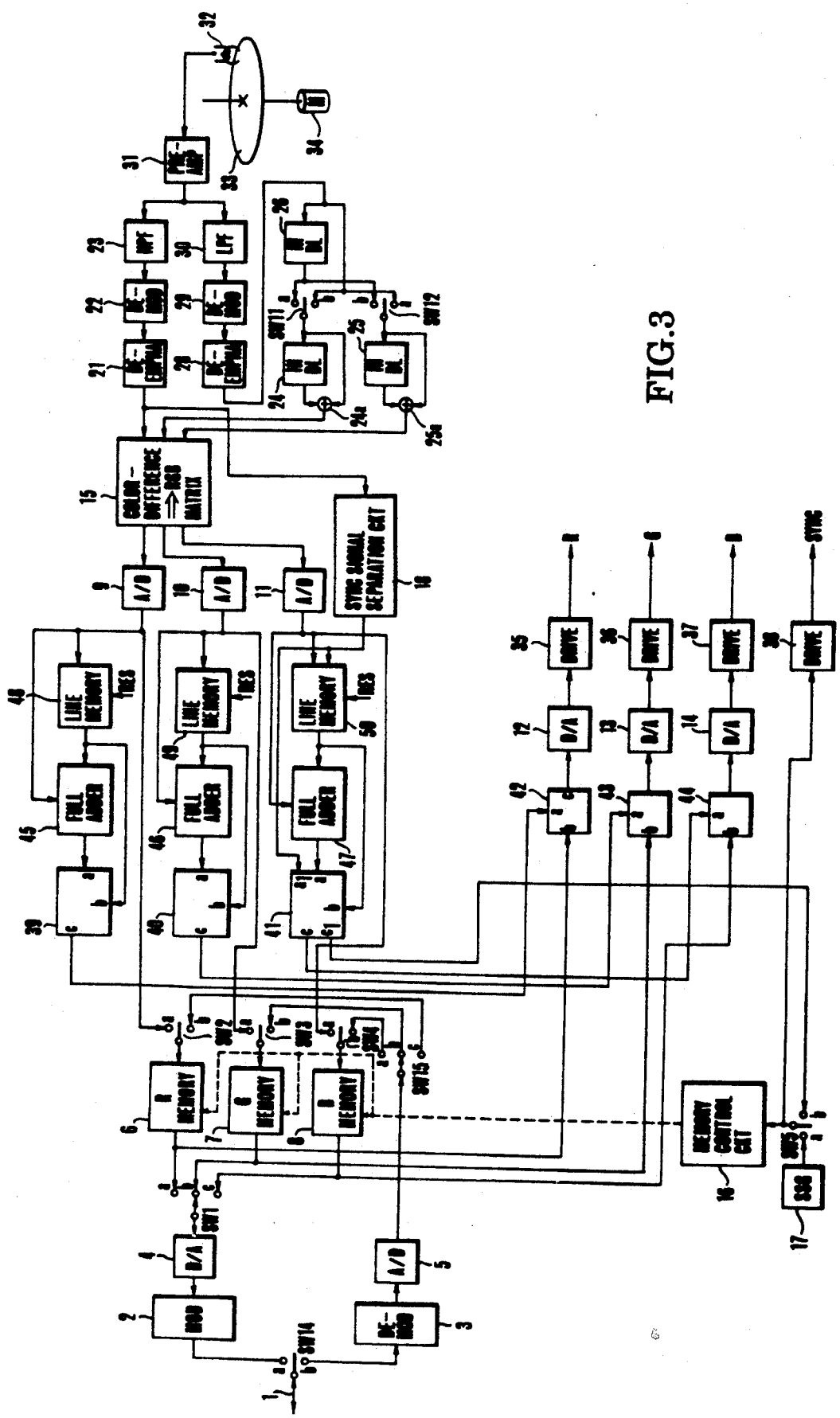
FIGS. 3 and 4 are block diagrams respectively showing the arrangement of still image signal transmitting and receiving devices which are arranged as embodiments of this invention.

The details of this invention are as described below on the basis of the embodiments thereof:

FIG. 3 shows a still image signal transmitting and receiving device arranged according to this invention as a first embodiment thereof. In FIG. 3, the same component parts as those shown in FIG. 2 are indicated by the same reference numerals and symbols, and the details of them are omitted from the following description.

In the first embodiment shown in FIG. 3, a luminance signal and two simultaneous-converted color-difference signals are supplied directly to a color-difference-to-RGB conversion matrix circuit 15 without passing through the skew compensating circuit which is shown as the DL 19 and the DL 27 in FIG. 2. Further, unlike the conventional system, the first embodiment shown in FIG. 3 is not provided with the interpolation circuit (the DL 20 of FIG. 2) for the luminance signal.

The color-difference-to-RGB conversion matrix circuit 15 outputs R, G and B signals. These signals are supplied to A/D converters 9, 10 and 11 to be sampled and converted into digital data at a rate of eight bits per sample. The digital data from the A/D converters is supplied to 8-bit line memories 48, 49 and 50; to 8-bit full adder circuits 45, 46 and 47; and to 8-bit data selectors 39, 40 and 41. These circuits perform the skew compensating and interpolating actions to convert the reproduced field still image signal into an interlaced frame still image signal.

The first embodiment shown in FIG. 3 performs the skew compensating and interpolating actions in the following manner: These actions require the use of 0.5-H and 1-H delay lines (DLs). These delay lines are not used simultaneously. Therefore, in the case of the first embodiment, line memories 48, 49 and 50 which are arranged to have their delay time controllable according to the period of a reset pulse are used as 0.5-H delay lines for the skew compensation and as 1-H delay lines for the interpolating process.

For example, the delay time is arranged to be controlled by resetting a reading address counter (not shown) by means of the reset pulse and by setting a writing address at a value which is smaller by one than the value of a reading address. This arrangement enables the embodiment to have only one line memory for each of the R, G and B signals.

As for the outputs of the full adder circuits 45, 46 and 47, upper eight bits including an end-around carry output are used. The period of the reset pulse to be supplied to the line memories 48, 49 and 50 is changed between the 0.5-H and 1-H periods according to the field period. Each of the data selectors 39, 40 and 41 is arranged to select one side "b" shown in FIG. 3 when the period of the reset pulse is at the 0.5-H period and to select another side "a" for the output of the full adder circuits 45, 46 or 47 when the reset pulse period is at the 1-H period. The skew compensation and interpolating process actions are performed on the outputs of the full adder circuits by this arrangement.

During the equalizing pulse interval, the reset pulse is kept at the 0.5-H period and the sides "b" of the data selectors 39, 40 and 41 are selected to obtain interlaced frame still image signals. These signals are supplied to the sides "a" of data selectors 42, 43 and 44. In a case where a still image signal reproduced from the magnetic disc 33 is to be output, the R, G and B signals are output by selecting the sides "a" of the data selectors 42, 43 and 44.

In a case where a still image signal is to be restored and reproduced from a transmitted signal received through a telephone line 1, the sides "b" of the data selectors 42, 43 and 44 are selected.

In a case where a signal recorded on the magnetic disc 33 is to be reproduced and to be output in a state of being restored to a still image signal, the sync signal also must be subjected to a skew compensating process. In that case, the B signal which does not have to have much tonal gradation as compared with the R and G signals is digital-processed while using seven bits, and the remaining one bit is used for skew-compensating the sync signal separated from the reproduced luminance signal. More specifically, with respect to the one bit to be used for the sync signal, the sync signal separated by the sync signal separation circuit 18 is supplied to a terminal a1 of the data selector 41 while the output of the line memory 50 is supplied to the side "b" of the data selector 41 in the same manner as the R or G signal. Then, a frame sync signal is output from the output side c1 of the data selector 41. When the signal recorded on the magnetic disc 33 is reproduced and output in a state of having been restored to a still image signal, the sync signal is output through the switch SW5 and the 75-ohm driving circuit 38.

In the case of the first embodiment shown in FIG. 3, the line-simultaneous conversion circuit which consists of the 1-H analog delay lines (hereinafter referred to as DLs) 24, 25 and 26, the switches SW11 and SW12 and the adders 24a and 25a is arranged to process analog signals in the same manner as in the case of FIG. 2. However, the signals are averaged through an addition type 1-H comb filter which consists of the 1-H analog DLs 24 and 25 and the adders 24a and 25a. Therefore, the still image signal produced is free from a flicker, etc. without providing the 1-H analog DL 26 with any particular level adjusting and temperature-drift correcting arrangement.

Figure 4:
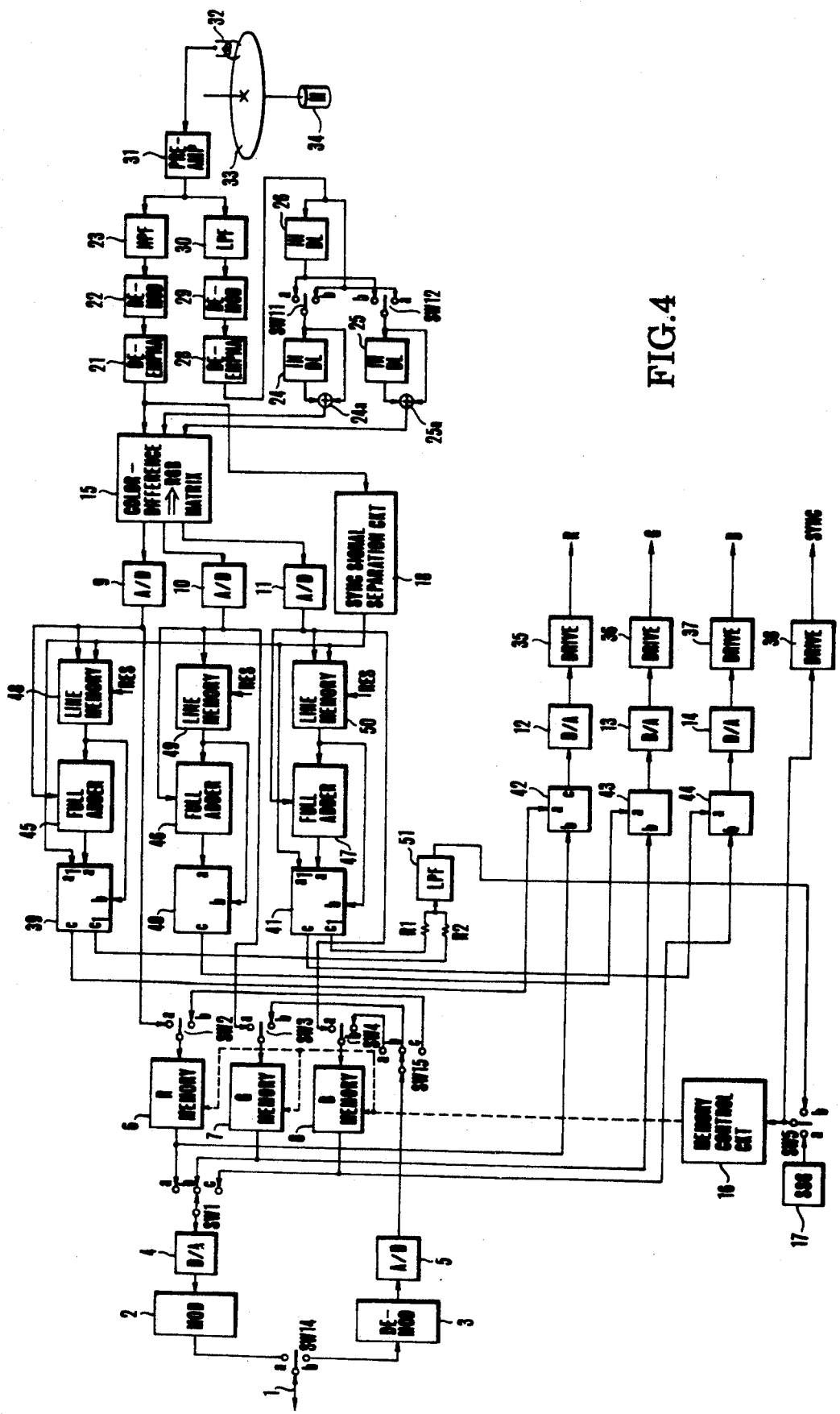

FIG. 4 shows the arrangement of a still image signal transmitting and receiving device to which this invention is applied as a second embodiment thereof. In the following, the second embodiment is described covering only the points in which it differs from the first embodiment shown in FIG. 3. The differences are as follows:

(1) Seven bits are used for the line memory 48 which is provided for the R signal. The remaining one bit is used for the sync signal. (2) The outputs of the data selectors 39 and 41 which are for the sync signal are added together through resistors R1 and R2. The sum thus obtained is supplied to an LPF (low-pass filter) 51. The output of the LPF 51 is used as reproduced sync signal.

With the second embodiment arranged in this manner, any jitter component of the sync signal which might be generated in the first embodiment shown in FIG. 3 can be minimized. This enables an external monitor or a printer that is connected to the device as an external device to have a still image without much jitter.

Each of the embodiments described reproduces a signal recorded on a magnetic disc and restores it to a still image signal by using the A/D and D/A converters which are the same as those used in the conventional device. In addition to these converters, the line memories, the full adder circuits and the data selectors are provided for digital skew compensating and interpolating processes, which can be stably and accurately carried out without necessitating any level adjustment and any temperature-drift correction. Therefore, a still image signal can be stably restored. Another advantage of the invention resides in that, since no image memory is used for the skew compensation and the interpolation, a reproducing operation can be performed to reproduce a still image signal from the magnetic disc even during the process of transmitting or receiving a still image signal.

What is claimed is:

1. An image signal restoring device for restoring an image signal, comprising:
   (a) memory means arranged to input a digital image signal and to delay the input digital signal either for 0.5H (H representing one horizontal scanning period) in order to effect a skew compensating process or for 1H in order to effect an interpolating process;
   (b) addition means arranged to add together the digital image signal which has been delayed by said memory means and a digital image signal which is input to said memory means and to output a signal resulting from the addition; and
   (c) selective output means arranged to input the signal output from said memory means and the signal output from said addition means and to select and output either the signal output from said memory means when the input digital image signal is delayed for said 0.5H in order to effect the skew compensating process or the signal output from said addition means when the input digital image signal is delayed for said 1H in order to effect the interpolating process.

2. A device according to claim 1, wherein said addition means includes a full adder arranged to fully add together the digital image signal which has been delayed by said memory means and the digital image signal which is input to said memory means.

3. A device according to claim 1, wherein said memory means includes:
   (a) a line memory which is capable of storing one line amount of digital image signal; and
   (b) line memory control means capable of resetting said line memory in a cycle of either 0.5H hen the skew compensating process is effected or in a cycle of 1H when the interpolating process is effected.

4. A device according to claim 1, further comprising conversion means arranged to convert the digital image signal output from said selective output means into an analog image signal and to output the analog image signal.

5. A device according to claim 1, further comprising transmission means for transmitting an input digital image signal in blocks of one picture amount thereof.

6. A device according to claim 5, wherein said transmission means includes:
   (a) an image memory which is capable of storing one picture amount of input digital image signal;
   (b) conversion means arranged to convert the digital image signal stored in said image memory into an analog image signal and to output the analog image signal; and
   (c) transmitting signal forming means for forming a transmitting signal from the analog image signal output from said conversion means.

7. An image signal restoring device for restoring an image signal, comprising:
  (a) reproducing means arranged to reproduce from a recording medium an analog image signal recorded on said recording medium, to convert the analog image signal reproduced from said recording medium into a first digital image signal and to output sid first digital image signal;
  (b) signal receiving means arranged to receive a transmitted image signal, to convert the received image signal into a second digital image signal and to output said second digital signal;
  (c) an image memory capable of selectively storing either one picture amount of said first digital image signal output from said reproducing means or one picture amount of the second digital image signal output from said receiving means;
  (d) a line memory arranged to input said first digital image signal output from said reproducing means and to delay every one-line amount of said input first digital image signal either for 0.5H (H representing one horizontal scanning period) in order to effect a skew compensating process or for 1H in order to effect an interpolating process;
  (e) addition means arranged to add together the one-line amount of said first digital image signal which has been delayed by said line memory and the one-line amount of said first digital image signal which is input to said line memory and to output a signal resulting from the addition; and
  (f) selective output emans arranged to input the signal output from said line memory and the signal output from said addition means and to select and output, as a third digital image signal, either the signal output from said line memory when one line amount of said input first digital image signal is delayed by said line memory for 0.5H in order to effect the skew compensating process or the signal output from said addition means when said one line amount of said input first digital image signal is delayed by said line memory for 1H in order to effect the interpolating process.

8. A device according to claim 7, wherein a period of time for which said input first digital image signal is to be delayed by said line memory is arranged to be alternately changed, between 0.5H and 1H, every time one field amount of said first digital image signal is supplied from said reproducing means.

9. A device according to claim 7, wherein said addition means includes a full adder arranged to fully add together the digital image signal which has been delayed by said line memory and the digital image signal which is input to said line memory.

10. An image signal restoring device for restoring an image signal for one frame comprising image signals for two fields corresponding to two images interleaved to each other on a picture plane, from an image signal for one field; comprising:
  (a) reproducing means arranged to reproduce the image signal for one field from a recording medium on which the image signal for one field is recorded and to convert the image signal for one field reproduced from said recording medium into a first digital image signal for one field and to output the converted signal;
  (b) signal receiving emans arranged to receive a transmitted image signal for one field and to convert the received image signal for one field into a second digital image signal for one field and to output the converted signal;
  (c) an image memory capable of selectively storing the first digital image signal for one field output from said reproducing means or the second digital image signal for one field output from said receiving means; and
  (d) digital image signal forming means for forming the digital image signal for one field from the first digital image signal for one field output from said reproducing means.

* * * * *

UNITED STATES PATENT AND TRADEMARK OFFICE
CERTIFICATE OF CORRECTION

PATENT NO. : 5,159,467
DATED     : October 27, 1992
INVENTOR(S) : Somei Kawasaki It is certified that error appears in the above-identified patent and that said Letters Patent is hereby corrected as shown below:

Col. 2, line 37.  Change "filed" to -- field --
    Col. 4, line 43.  Change "it is" to -- they are --
    Col. 7, line 2.   After "44." insert -- In a case where a still image signal reproduced from the magnetic disc 33 is to be output, the R, G and B signals are output by selecting the sides "a" of the data selectors 42, 43 and 44. --
    Col. 8, line 46.  Change "hen" to -- when --
    Col. 9, line 31.  Change "emans" to -- means --
    Col. 10, line 26. Change "emans" to -- means --

Signed and Sealed this

Sixteenth Day of November, 1993

Attest:

BRUCE LEHMAN

Attesting Officer

Commissioner of Patents and Trademarks